United States Patent [19]

Seipler et al.

[11] Patent Number: 5,107,708

[45] Date of Patent: * Apr. 28, 1992

[54] ACCELERATION PICK-UP

[75] Inventors: Dieter Seipler; Jiri Marek, both of Reutlingen; Botho Ziegenbein, Neckarsteinach; Martin Holland, Tübingen, all of Fed. Rep. of Germany

[73] Assignee: Robert Bosch GmbH, Stuttgart, Fed. Rep. of Germany

[ * ] Notice: The portion of the term of this patent subsequent to Sep. 11, 2007 has been disclaimed.

[21] Appl. No.: 457,762

[22] PCT Filed: Apr. 25, 1989

[86] PCT No.: PCT/DE89/00263

§ 371 Date: Jan. 3, 1990

§ 102(e) Date: Jan. 3, 1990

[87] PCT Pub. No.: WO89/11104

PCT Pub. Date: Nov. 16, 1989

[30] Foreign Application Priority Data

May 3, 1988 [DE] Fed. Rep. of Germany ....... 3814949

[51] Int. Cl.$^5$ .............................................. G01P 15/12
[52] U.S. Cl. ........................................ 73/517 R; 338/5
[58] Field of Search ............... 73/517 R; 338/2, 5, 338/46; 280/735

[56] References Cited

U.S. PATENT DOCUMENTS 4,488,445  1/1984  Aske ................................. 73/517 R
4,955,234  9/1990  Marek ............................... 73/517 R

FOREIGN PATENT DOCUMENTS 2174500  11/1986  United Kingdom .
87/05704  9/1987  World Int. Prop. O. .

Primary Examiner—John E. Chapman
Attorney, Agent, or Firm—Michael J. Striker

[57] ABSTRACT

In an acceleration pick-up (11), the bending spring (13) is a substrate plate, e.g. produced from Al$_2$O$_3$, which is arranged at one side on an elevated portion (12) of a support (10) produced from mechanically rigid material. Accordingly, the resistors (19 to 22) and particularly the evaluating circuit (24) on an elevated portion (12) of the support (10) can be arranged jointly on the bending spring (13) and applied in a single work step using thick-film technology. In addition, a cut out portion (14) is formed in the bending spring (13), so that two bending webs (15, 16) can be formed at the greatest possible distance from one another. Two of the resistors (19, 21) are arranged on the bending webs (15, 16) and one of the remaining resistors (20, 22) is arranged in the area of the cut out portion (14). Accordingly, an electrical monitoring of the mechanical state of the bending spring (13) is made possible.

6 Claims, 2 Drawing Sheets

ACCELERATION PICK-UP

BACKGROUND OF THE INVENTION

The invention is based on an acceleration pick-up. In acceleration pick-ups, it is known to clamp in the bending spring at one side along the entire width and to determine the deflection of the bending spring by means of piezo-resistive elements. These pick-ups are relatively highly sensitive transversely and have no warning device when the bending spring breaks or is damaged in some other way.

SUMMARY OF THE INVENTION

The acceleration pick-up, according to the invention, includes flat bending spring of a ceramic material, the spring having a recess defining with lateral edges of the spring two bending webs, elongation-sensitive resistors applied on the webs, additional resistors applied on the spring between the webs and close to the recess and being connected in a Wheatstone bridge. The invention has the advantage that it determines the acceleration in a particularly simple, accurate and reliable manner. The transverse sensitivity of the bending spring to acceleration in the plane of the bending spring is reduced. In addition, transverse signals brought about by torsion of the bending spring are suppressed by the suspension. The bending spring is accordingly only sensitive to bending. A simple testing of the functioning of the mechanical area of the pick-up, i.e. its bending spring, at all times is made possible by means of the special arrangement of the resistors of the Wheatstone bridge circuit. The electrically closed circuit of the Wheatstone bridge is interrupted by mechanical damage to the web. Accordingly, an electrical monitoring of the mechanical state of the pick-up is also possible in the installed state. The oscillating seismic mass can also be included in the electrical monitoring by means of the special arrangement of the resistors as close as possible to the recess. The evaluation circuit can be arranged on a lengthening of the bending spring. Accordingly, the evaluating circuit can be applied on a ceramic substrate in an area of high strength using hybrid technology. No interference signals are produced in the evaluating circuit by means of mechanical deformation in this area. In addition, the bending spring can accordingly be constructed so as to be relatively thin and sensitive.

BRIEF DESCRIPTION OF THE DRAWING

An embodiment example of the invention is shown in the drawing and explained in more detail in the following description.

DESCRIPTION OF THE PREFERRED EMBODIMENT

Figure 1:
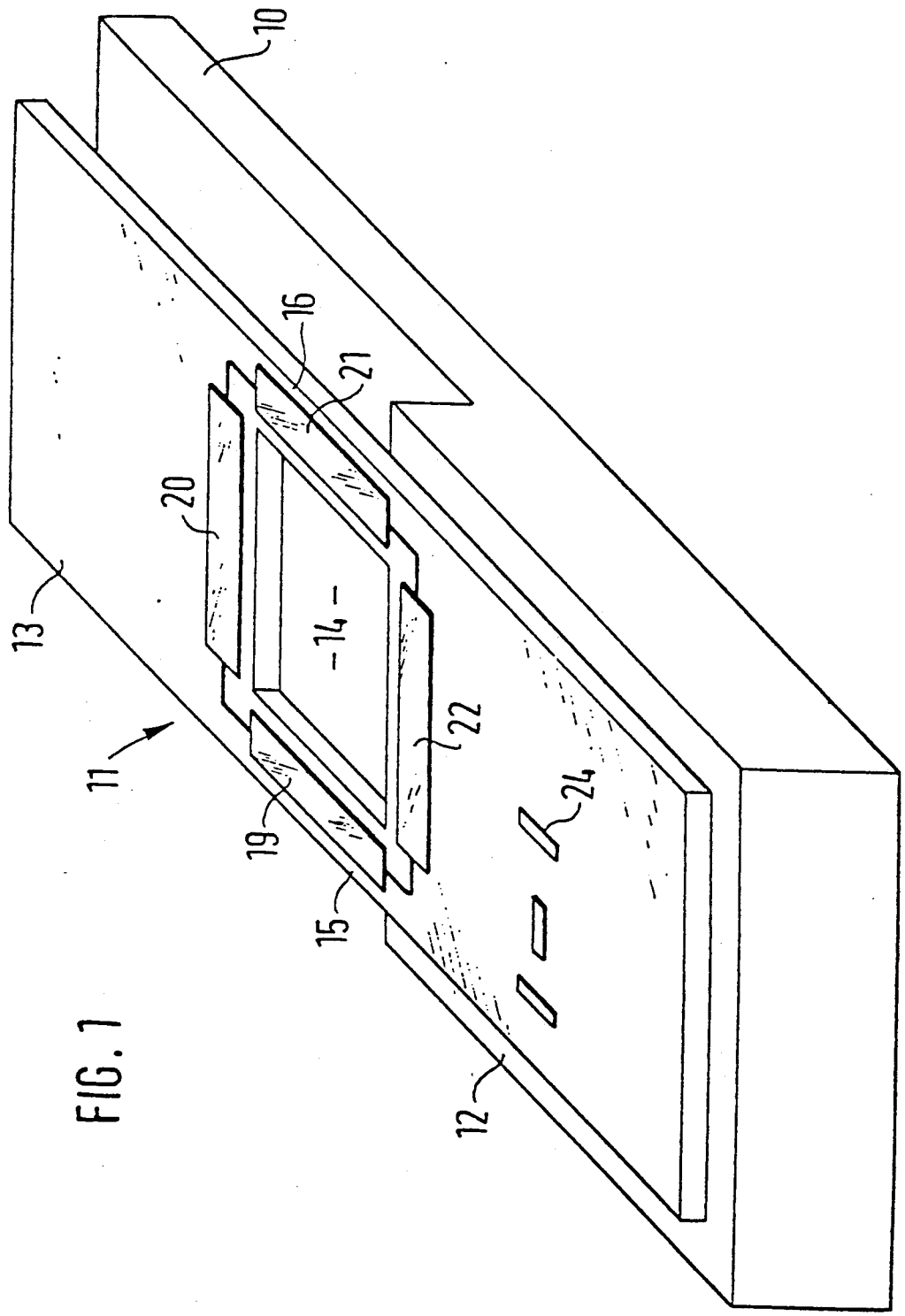
FIG. 1 shows a perspective view of a pick-up of the invention.

The stepped support of an acceleration pick-up 11, which can be produced from a relatively rigid material, is designated by 10 in FIG. 1. A bending spring 13 which serves as seismic mass and comprises ceramic material, e.g. aluminum oxide ($Al_2O_3$), is arranged on the elevated portion 12 of the support 10. The bending spring 13 comprises a cut out portion 14 in the area of the step of the support, so that two bending webs 15, 16 which extend parallel to one another are accordingly formed with which the bending spring is fastened in an elastic manner on the step or elevated portion 12 of the support 10. The cut out portion 14 is dimensioned such that the bending webs 15, 16 are as far as possible from one another, in particular, the outer edges of the bending webs 15, 16 can extend so as to be aligned with the outer edges of the bending spring 13. As can be seen the bending webs 15, 16 are arranged at two opposite marginal areas of the support 10.

In order to determine the deflection, the four sensor resistors 19 to 22 of a Wheatstone bridge circuit, which are sensitive to elongation, are arranged on the bending spring 13. The oppositely located resistors 19, 21 are arranged on the bending webs 15, 16 respectively. The remaining two resistors 20 and 22, respectively, are located on the oscillatory area of the bending spring 13, namely in the area near to the cut out portion 14 on the free part of the bending spring 13 and in the area on the part of the spring located on the elevated portion 12. The resistors 19 to 22 are applied to the bending spring 13 using thick-film technology and work according to the principle of piezo-resistance.

In addition, an evaluating circuit 24 is located on a lengthening of the bending spring 13, i.e. in the area of the elevated portion 12 of the support 10, using hybrid technology. It comprises active, e.g. amplifying members (semiconductors) and passive e.g. R-, C-components. The evaluating circuit 24 is also constructed using thick-film technology.

Electrical lines lead from the evaluating circuit 24 to a control device, not shown, which can trigger the passenger protection devices of the motor vehicle, e.g. belt tighteners or air bags.

Figure 2:
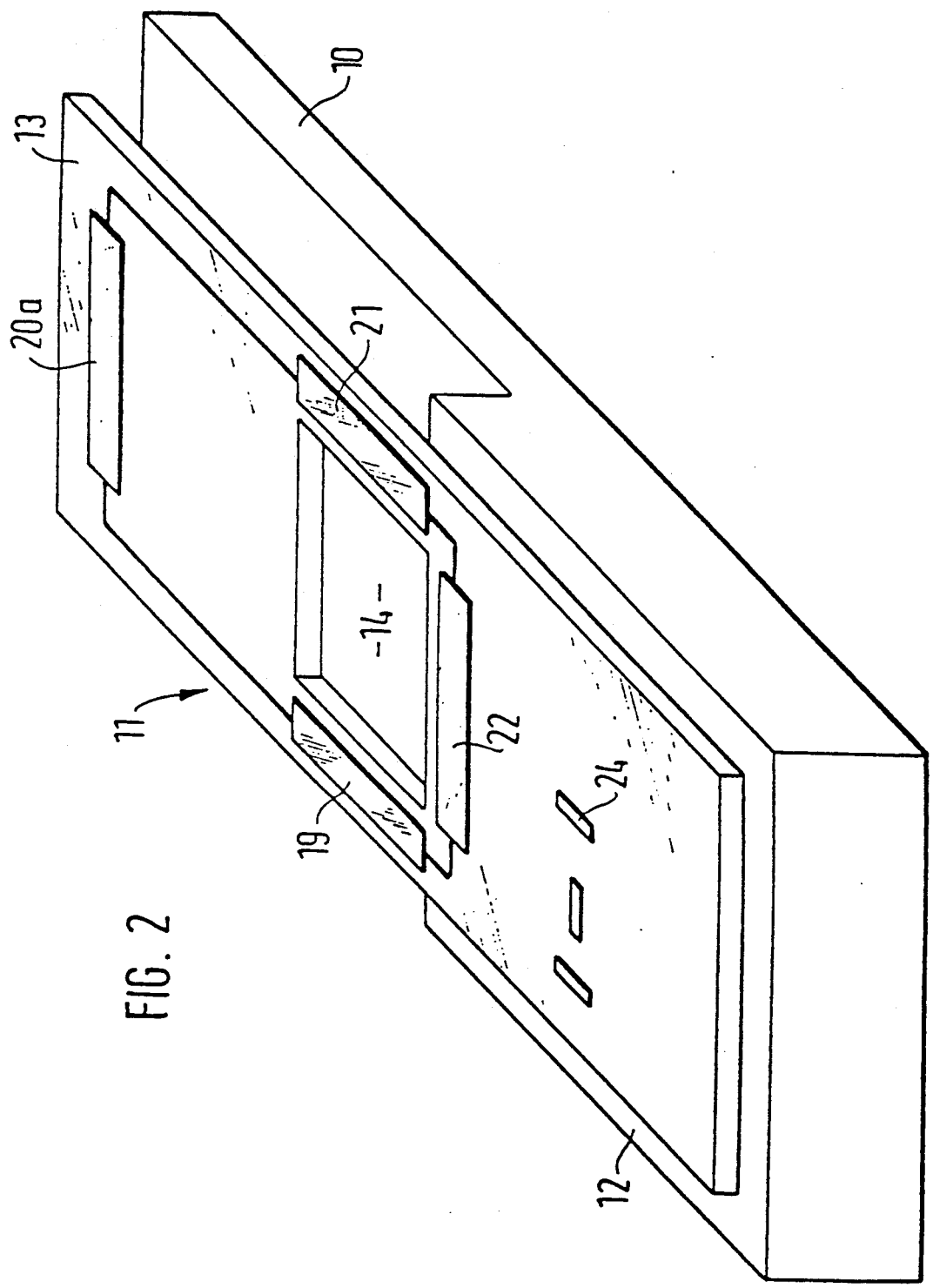
FIG. 2 shows a modification of the pick-up of FIG. 1.

The mechanical state of the bending spring 13 can be monitored electrically by means of the Wheatstone bridge circuit. If the bending webs 15, 16 are damaged, e.g. if one of them breaks, the electrical closed circuit of the Wheatstone bridge circuit is interrupted. The electrical lines between the resistors 19 to 22 of the bridge circuit are minimized in the construction according to FIG. 1. As shown in FIG. 2, the resistor 20a can also be arranged at the end of the bending spring 13 remote of the elevated portion 12. Accordingly, it is possible to monitor the mechanical operability of the entire bending spring, since the lines are guided along the entire circumference of the bending spring 13.

The functioning of an acceleration pick-up 11 is sufficiently known and therefore need not be described in more detail. If the bending spring 13 is deflected from its rest position, the bending spring 13 is bent in the area of the bending webs 15, 16, i.e. in the area of the resistors 19, 21, and produces a proportional change in resistance in the latter. This change in resistance is evaluated in the evaluating circuit 24 and transmitted to the control device.

Since the bending spring 13 is a ceramic substrate plate, the resistors 19 to 22 can be arranged on the bending spring and the evaluating circuit 24 can be arranged on the lengthening of the latter, i.e. in the area of the elevated portion 12 of the support 10, in a single work step using thick-film technology. The production costs are accordingly minimized. In addition, the evaluating circuit 24 can be applied in an area virtually free of mechanical bending stresses by means of the rigid material of the support 10. Accordingly, interference signals in the evaluating circuit 24 can be prevented.

We claim:

1. Acceleration pick-up for the automatic triggering of passenger protection devices in vehicles, which transmits a control signal during a deviation from an allowable attitude of the vehicle and comprises a bending spring (13) which serves as seismic mass and comprises ceramic material, characterized in that the pick-up is integrated in a circuit which is produced using thick-film technology, the bending spring (13) is suspended in an elastic manner with at least two bending webs (15, 16) fastened at a support, in that elongation-sensitive resistors (19, 21) are located on the bending webs (15, 16), and in that additional resistors (20, 22) are arranged on the bending spring (13) in the area of the recess (14) formed between the bending webs (15, 16), and in that all the resistors (19-22) are applied on the bending spring (13) using thick-film technology and are connected in a Wheatstone bridge.

2. Pick-up according to claim 1, characterized in that the bending spring (13) has an oscillatory area, and the resistor (22) is arranged in the oscillatory area of the bending spring (13) and located as close as possible to the area of the recess (14).

3. Pick-up according to claim 1, characterized in that the bending spring (13) has an oscillatory area, and the resistor (22) is arranged in the oscillatory area of the bending spring (13) and located on the end of the bending spring (13) remote of the recess (14).

4. Pick-up according to claim 1, characterized in that the support has two opposite marginal areas, and the two bending webs (15, 16) are arranged at the two opposite marginal areas of the support.

5. Pick-up according to claim 1, characterized in that all the resistors (19 to 22) are constructed as piezo-resistive thick-film resistors.

6. Pick-up according to claim 1, characterized in that the bending spring (13) comprises a lengthening arranged on an elevated portion (12) of the support (10), and an evaluating circuit (24) being arranged on the lengthening using hybrid technology.

* * * * *